United States Patent

Benner et al.

Patent Number: 6,142,594
Date of Patent: Nov. 7, 2000

[54] RACK WITH A LOWER FRAME AND AN UPPER FRAME MADE OF A CONTINUOUS SECTION

[75] Inventors: Rolf Benner; Martina Köhler, both of Herborn; Udo Münch, Sinn; Wolfgang Reuter, Burbach, all of Germany

[73] Assignee: Rittal-Werk Rudolf Loh GmbH & Co. KG, Herborn, Germany

[21] Appl. No.: 09/308,354

[22] PCT Filed: Nov. 6, 1997

[86] PCT No.: PCT/EP97/06152

§ 371 Date: Jul. 14, 1999

§ 102(e) Date: Jul. 14, 1999

[87] PCT Pub. No.: WO98/23002

PCT Pub. Date: May 28, 1998

[30] Foreign Application Priority Data

Nov. 19, 1996 [DE] Germany .......................... 196 47 780

[51] Int. Cl.⁷ .................................................. A47B 43/00
[52] U.S. Cl. ........................................ 312/258; 312/265.4
[58] Field of Search .............................. 312/257.1, 265.1, 312/265.2, 265.3, 265.4, 265.6, 223.1, 258, 251.1; 211/189, 190, 191, 26; 248/346.3

[56] References Cited

U.S. PATENT DOCUMENTS

| | | | |
|---|---|---|---|
| 3,110,535 | 11/1963 | Anderson | 312/265.5 |
| 3,129,841 | 4/1964 | Loewenthal et al. | 312/351 |
| 3,642,310 | 2/1972 | Hudson | 312/275.1 |

FOREIGN PATENT DOCUMENTS

| | | |
|---|---|---|
| 0 577 140 | 1/1994 | European Pat. Off. . |
| 0 649 205 | 4/1995 | European Pat. Off. . |
| 36 11 693 | of 0000 | Germany . |
| 1 465 347 | 4/1969 | Germany . |
| 37 31 547 | 3/1989 | Germany . |
| 41 37 687 | 4/1993 | Germany . |
| 41 40 072 | 6/1993 | Germany . |
| 93 04 630 | 7/1993 | Germany . |
| 92 10 550 | 10/1993 | Germany . |
| 2 231 117 | 11/1990 | United Kingdom . |

*Primary Examiner*—Peter M. Cuomo
*Assistant Examiner*—Jerry A. Anderson
*Attorney, Agent, or Firm*—Pauley Petersen Kinne & Fejer

[57] ABSTRACT

A rack for a switching cabinet with a lower frame and an upper frame, which have horizontal length and width struts on which vertical frame sections can be arranged. The upper and lower frames are easy to produce and involve little technical complexity if the length and width struts are connected to form a continuous section in a single piece and the section is formed from a stamped and bent piece.

10 Claims, 3 Drawing Sheets

RACK WITH A LOWER FRAME AND AN UPPER FRAME MADE OF A CONTINUOUS SECTION

BACKGROUND OF THE INVENTION

1. Field of the Invention

This invention relates to a rack for a switching cabinet with a bottom and top frame assembled from horizontal depth and width struts, wherein the depth and width struts arranged at an angle to each other have corner mounts open to an outside of the rack on which vertical frame sections can be mounted, the ends of the depth and width struts form guides on which the vertical frame sections are positioned, and the depth and width struts of the bottom and/or top frame are joined in one piece into a continuous section.

2. Description of Prior Art

This type of rack is known from Great Britain Patent Reference GB 2 231 117 A. A rack with a bottom and top frame is shown in this document in which the bottom and top frames are designed in three parts. Specifically, upper and lower flange plates are joined via four side parts. The flange plates are welded to the side plates. Notches that serve as corner mounts for the vertical frame sections are provided in the corner regions of the flange plates. The ends of the U-shaped side parts extend slightly into the corner mounts and therefore form guides on which the vertical frame sections lie in the assembled state. The manufacturing cost to produce such bottom and top frames is significant. Moreover, precise longitudinal alignment of the vertical frame section poses problems and is not simple to carry out without additional aid.

A switching cabinet having two vertical side parts joined via horizontal plates is known from European Patent Reference EP 0 577 140 A1. The vertical side parts have a frame-like design and can be made from a continuous section. The continuous section has angled notches. The continuous section can be bent in the region of these notches so that a closed frame is formed.

This type of rack is known, for example, from German Patent Reference DE 36 11 693. The bottom and top frame of such a rack are produced from two depth and width struts and four identical corner connectors. The depth and width struts are designed as hollow sections into which the plug-in projections of the corner connectors are inserted. The vertical frame sections are also pushed onto a plug-in projection of the corner connector. To achieve a rigid connection, the depth and width struts, as well as the vertical frame sections, are welded to each other on the corner connectors.

SUMMARY OF THE INVENTION

It is one object of this invention to provide a rack of the initially mentioned type in which a simplified design is achieved for the bottom and/or top frames and to which the vertical frame section can be added on simply and fitted precisely.

This object is achieved with a continuous section formed from a stamped and bent part, wherein the depth and width struts are joined to each other via connection sections, on which the depth struts can be bent out relative to the width struts. In the vertical direction mounting surfaces at a spacing from the guides are arranged in the corner mounts of the bottom and/or top frame on which the ends of the vertical frame section are positioned.

In this embodiment of a rack, a simple connection between adjacent depth and width struts arranged at an angle is achieved. To produce the bottom and top frame, a flat material blank or a steel sheet is first punched out. Profiling of the material blank then occurs so that a continuous section is produced. To produce the closed bottom/top frame the depth and width struts joined in one piece are bent out opposite each other. The free ends of the continuous section can be joined, for example, welded or screwed. The design of the bottom/top frame is substantially simplified since additional corner connectors for joining the depth and width struts can be dispensed; specifically, it is designed in one part. For matching alignment of the vertical frame section in the corner mount of the bottom/top frame, mounting surfaces on which the vertical frame sections are positioned on the end are used in addition to the guides that are formed from the ends of the depth and side struts. The mounting surfaces permit exact positioning of the vertical frame sections relative to the longitudinal direction.

In one preferred embodiment, the lower and/or top frame depth and width struts are lengthened on the end by projections molded on in one piece. The projections of adjacent depth and width struts of the continuous section can be joined together. The depth and width struts located on the ends of the continuous section can be joined with their free projections. The projections can be designed so that they produce a corner mount for the vertical frame section. Because the connection point between the depth and width struts is maintained at a spacing from the ends of the depth and width struts, they can be angled relative to each other so that their end regions are directly adjacent.

In one preferred embodiment of this invention, the depth and width struts have internal walls at right angles to each other facing the interior of the rack, which have rows of fastening mounts extending in the longitudinal direction, in which one of the internal walls is arranged horizontally and the other vertically. A support strut can be bent at a right angle from the horizontal internal wall and a base from the vertical internal wall. The support strut and the base can be connected via two external walls situated at a right angle to each other. The two outer walls positioned at a right angle thus form an outward facing corner mount in which the bevel of a side wall can be accommodated. Assembly rails or other internal components facing the interior of the switching cabinet can be attached on the rows of fastening mounts.

The projections lengthened over the ends of adjacent depth and width struts can carry functional element parts that can be assembled into a functional element. Assembly of the individual functional element parts occurs when the depth and width struts are bent toward each other. Thus, carrying devices can be formed with which the switching cabinet can be lifted, for example, on the top frame. It is also possible to assemble the partial units into a connector for the vertical frame section.

In order to cover the bottom surface enclosed by the depth and width struts of the bottom frame, a strut can be connected in one piece to the depth and width struts. Bottom sheets or cable feedthroughs can be positioned on this strut. In a region between the bottom sheets and the strut a continuous seal can be arranged.

In one preferred embodiment of this invention, a runoff channel for rain or spray water is formed in one piece on the depth and width struts of the top frame. Thus no water can reach the interior of the switching cabinet between the top frame and the connected side walls.

BRIEF DESCRIPTION OF THE DRAWINGS

This invention is further explained below with reference to preferred embodiments shown in the drawings wherein.

DESCRIPTION OF PREFERRED EMBODIMENTS

Figure 1:
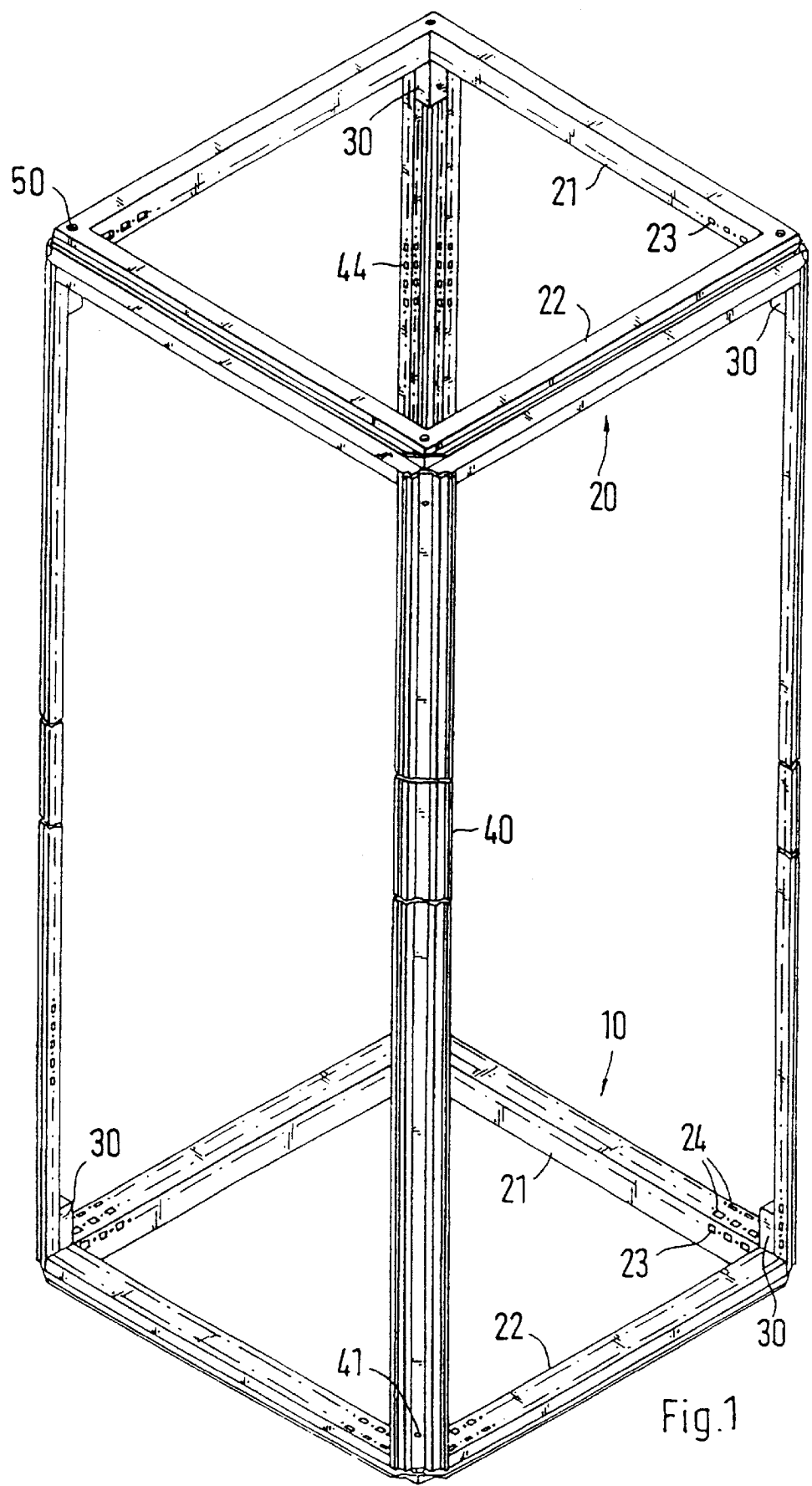
FIG. 1 is a perspective side view of a rack for a switching cabinet.

A rack for a switching cabinet is shown in FIG. 1. The rack is assembled essentially from a bottom frame 10, a top frame 20 and four vertical frame sections 40. The vertical frame sections 40 connect the bottom frame 10 to the top frame 20. The bottom and top frames 10 and 20 are designed identically so that they are interchangeable.

The bottom and top frames 10 and 20 each have two depth and two width struts 21, 22. The depth and width struts 21, 22 have rows of fastening mounts 23, 24 on section sides facing an interior of the rack. The vertical frame sections 40 also have fastening mounts 44 facing the interior of the rack. Electrical components or assembly aids, for example, assembly rails, can be mounted on the fastening mounts 23, 24, 44.

The vertical frame sections 40 are joined to the bottom and top frames 10, 20 via connectors 30. The connectors 30 are arranged in the region of the corner mounts of the bottom and top frames 10, 20. Fastening of the vertical frame sections 40 to connectors 30 occurs, for example, by means of screws. Thus the ends of vertical frame sections 40 can have screw mounts 41.

Figure 2:
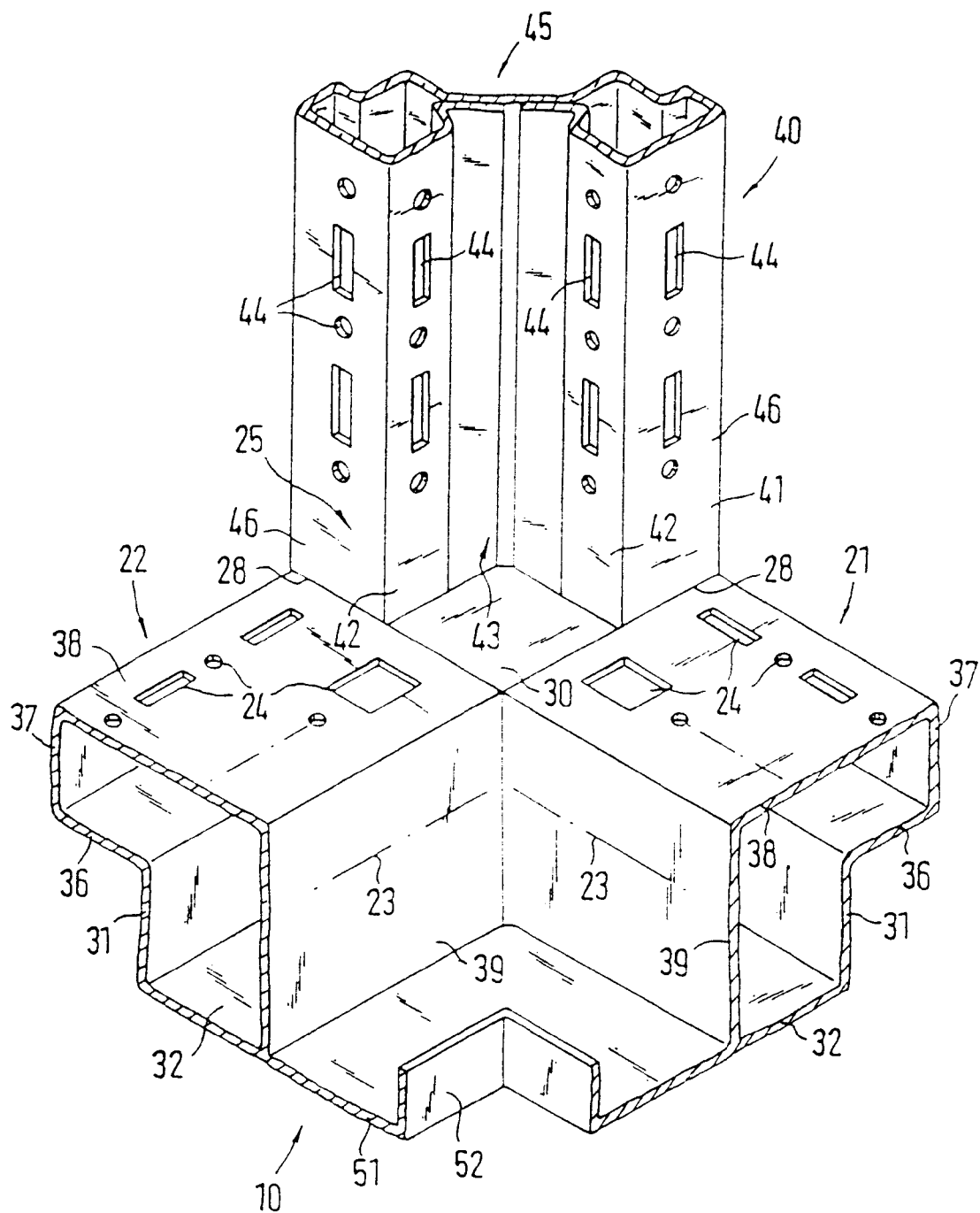
FIG. 2 is a perspective view of a corner region of a rack for a switching cabinet.

The corner region of a rack is further shown in the cutaway view of FIG. 2. This rack essentially corresponds to the rack according to FIG. 1. A difference is that the bottom frame 10 according to FIG. 2 carries a horizontal base plate 51 lying on the floor. A vertical upward protruding strut 52 is formed on the base plate 51. Plate elements can be positioned and sealed on strut 52. The depth and width struts 21, 22 of the bottom frame 10 have two inner walls 38, 39 positioned at right angles to each other which face the interior of the rack. The internal walls 38, 39 have rows of fastening mounts 23, 24.

The depth and width struts 21, 22 form a corner mount 25 in the region of their ends into which the vertical frame section 40 can be inserted. Thus, the ends of the depth and width struts 21, 22 form guides 28, which are positioned on the side walls 46 of the vertical frame section 40. The side walls 46 are at right angles to the corresponding sides of the rack and have a series of fastening mounts 44. Alternating slotted openings and holes form the fastening mounts 44. The spacing patterns of fastening mounts 44 of the side walls 46 match those of the rows of fastening mounts 24 of the internal wall 38 of bottom frame 10. The side walls 46 of the vertical frame section 40 are connected at right angles to the sides 42. The two sides 42 are at right angles to each other and form an internal mount 43 open toward the interior of the rack. Fastening elements, for example sections, can be inserted and fixed in the vertically extending internal mount 43. The two sides 42 abut the square connectors 30. Connector 30 is connected without play to the bottom frame 10 in the region of corner mount 25. The vertical frame section 40 can be either replaceably connected to the bottom frame 10 or welded into corner mount 25.

Support struts 37 are bent from the internal walls 38 from the depth and width struts 21, 22 of the bottom frame 10. The internal sides of the side walls 46 can be sealed into position against the support struts 37. The side walls 46 are thus screwed onto the vertical frame sections 40. The vertical frame sections 40 have an external mount 45 into which the corresponding fasteners can be screwed. The side walls 46 preferably have beveled edges. The vertically extended bevels can be accommodated in the external mounts 45 of the vertical frame section 40. To accommodate the horizontal bevels two external walls 31, 36 at right angles to each other are connected to the support strut 37. The two external walls 31, 36 form a shoulder that is recessed relative to support strut 37. To form a closed hollow section the depth and width struts 21 and 22 are sealed with a bottom 32. The bottom 32 joins the external wall 31 to the internal wall 39. The base plate 51 for strut 52 is also connected to the bottom 32.

Figure 3:
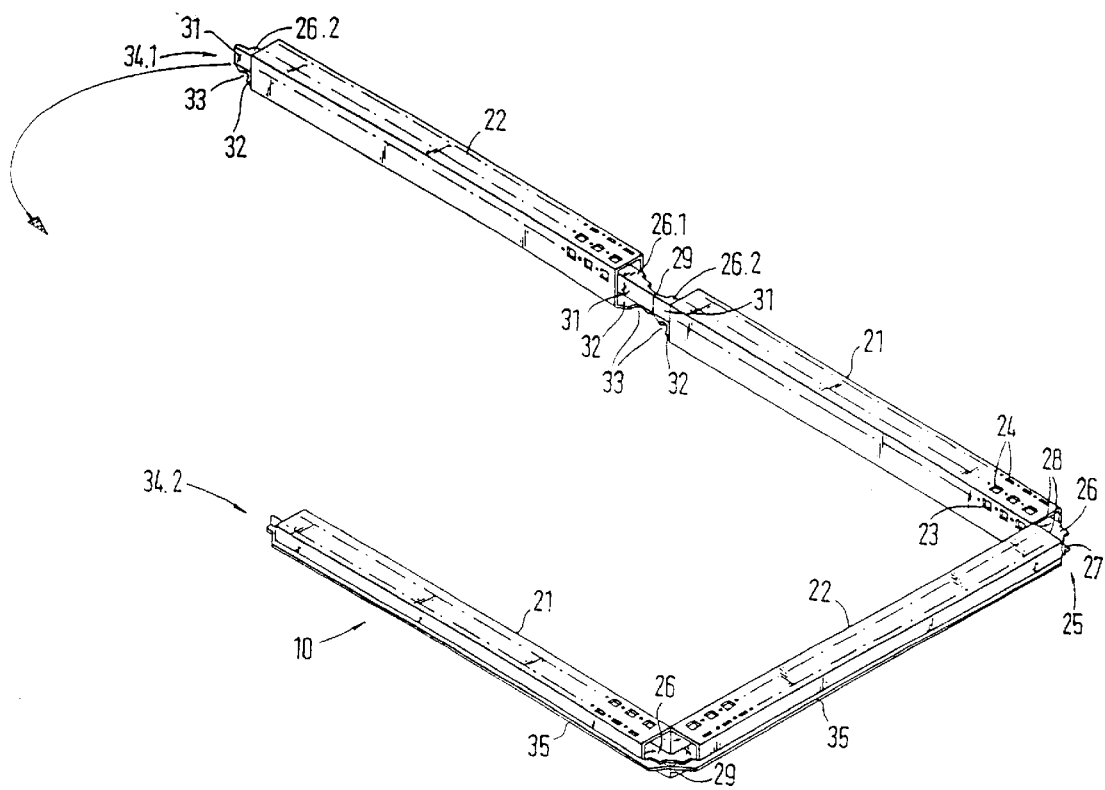
FIG. 3 is a perspective side view of a partially mounted bottom frame for the rack, according to FIG. 1.

The design of a bottom frame 10 can be seen in greater detail in FIG. 3 which shows the bottom and top frames 10, 20 produced in one piece. A stamped part is initially cut from a blank for manufacture. This stamped part is then profiled so that a continuous section is produced. The depth and width struts 21, 22 of this continuous section are joined via connection sections 29. The connection section 29 is configured as a vertically extending sheet strip having a reference bending site. This sheet strip is connected in one piece to the external wall 31 of the depth and width struts 21, 22. The second external wall 36 is also extended, like external wall 31, over the ends of depth and width struts 21, 22 so that a partial surface 26.1 and 26.2 is produced. The bottom 32 is likewise lengthened. Two semicircular cuts are made in this lengthened region and form functional element parts 33.

FIG. 3 shows that the individual depth and width struts 21, 22 can be bent out relative to each other on the connection section 29. The functional element parts 33 are joined into a single functional element. In the present example the two semicircular cuts form a hole that can be used to introduce a support lug. The two partial surfaces 26.1, 26.2 offer a mounting surface 26 for the vertical frame section 40. The vertical frame section 40 can be mounted with an end on the mounting surface 26. The mounting surface 26 is profiled on an edge 27 according to the external cross section of the vertical section 40. No interfering parts are thus present on the bottom frame 10 that would pose a hazard of injury or hamper the addition of side walls.

In order to close the bottom and top frames 10, 20 the end depth and width struts 21, 22 of the continuous section have end pieces 34.1, 34.2. When the end pieces 34.1, 34.2 are brought next to each other, the corner design in this region corresponds to the other corner designs. The end pieces 34.1, 34.2 can be welded to each other or joined in some other appropriate manner.

It can also be advantageous to strengthen the other corner regions of the bottom frame using welds to increase torsional rigidity.

FIG. 3 shows a runoff channel 35 profiled onto the bottom frame 10. As already mentioned, the bottom and top frames 10 and 20 are designed to be identical. If the frame shown in FIG. 3 is used as top frame 20, then the runoff channel 35 prevents water from reaching the interior of the switching cabinet between the top frame 20 and the corresponding side walls.

What is claimed is:

1. In a rack for a switching cabinet having a bottom frame and a top frame (10, 20) assembled from horizontal depth and width struts (21, 22) on which the depth and width struts (21, 22) are arranged at an angle to each other and have corner mounts (25) open to an outside of the rack on which vertical frame sections (40) can be mounted, wherein the ends of the depth and width struts (21, 22) form guides on which the vertical frame sections (40) are positioned and in which the depth and width struts of at least one of the lower frame and the top frame (10, 20) are joined together in one piece to a continuous section, the improvement comprising the continuous section formed from a stamped and bent part, the depth and width struts (21, 22) joined by a plurality of connection sections (29) on which the depth struts (21) are bent out relative to the width struts (22), and a plurality of vertical support surfaces (26) are spaced from the guides (28) in the corner mounts (25) of at least one of the lower frame and the top frame (10, 20) on which a plurality of first ends of the vertical frame sections (40) can be positioned.

2. In the rack according to claim 1, wherein the depth and width struts (21, 22) are lengthened by projections molded in one piece with the depth and width struts (21,22), the projections of adjacent ones of the depth and width struts (21, 22) of the continuous profile are joined together, and the depth and width struts (21,22) located on second ends of the continuous section form end pieces (34.1, 34.2) on the free projections that are joined together.

3. In the rack according to claim 2, wherein the depth and width struts (21, 22) have internal walls (38, 39) at right angles to each other facing the interior of the rack which have rows of fastening mounts (23, 24) extending in a longitudinal direction, one of the internal walls (38, 39) is arranged horizontally and the other vertically, a support strut (37) at right angles from the horizontal internal wall (38) and a bottom (32) is bent from the vertical internal wall (39), and the support strut (37) and the bottom (32) are joined by way of two external walls (31, 36) positioned at right angles.

4. In the rack according to claim 3, wherein the projections of the adjacent depth and width struts (21, 22) carry functional element parts joined into a functional element (50) in the angled depth and width struts (21, 22).

5. In the rack according to claim 4, wherein a strut (52) is connected in one piece to the depth and width struts (21, 22) of the bottom frame (10) and is spaced from the depth and width struts (21, 22).

6. In the rack according to claim 5, wherein a runoff channel (35) to divert rain or spray water is molded in one piece onto the depth and width struts (21, 22) of the top frame (20).

7. In the rack according to claim 1, wherein the depth and width struts (21, 22) have internal walls (38, 39) at right angles to each other facing the interior of the rack which have rows of fastening mounts (23, 24) extending in a longitudinal direction, one of the internal walls (38, 39) is arranged horizontally and the other vertically, a support strut (37) at right angles from the horizontal internal wall (38) and a bottom (32) is bent from the vertical internal wall (39), and the support strut (37) and the bottom (32) are joined by way of two external walls (31, 36) positioned at right angles.

8. In the rack according to claim 2, wherein the projections of the adjacent depth and width struts (21, 22) carry functional element parts joined into a functional element (50) in the angled depth and width struts (21, 22).

9. In the rack according to claim 1, wherein a strut (52) is connected in one piece to the depth and width struts (21, 22) of the bottom frame (10) and is spaced from the depth and width struts (21, 22).

10. In the rack according to claim 1, wherein a runoff channel (35) to divert rain or spray water is molded in one piece onto the depth and width struts (21, 22) of the top frame (20).

\* \* \* \* \*